US010693579B2

(12) United States Patent
Boura et al.

(10) Patent No.: US 10,693,579 B2
(45) Date of Patent: Jun. 23, 2020

(54) TRANSPARENT CLOCKING IN CROSS CONNECT SYSTEM

(71) Applicant: IPG Photonics Corporation, Oxford, MA (US)

(72) Inventors: Jihad Boura, Northborough, MA (US); George Buabbud, Shrewsbury, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 16/418,194

(22) Filed: May 21, 2019

(65) Prior Publication Data

US 2020/0076525 A1    Mar. 5, 2020

Related U.S. Application Data

(63) Continuation of application No. 15/474,561, filed on Mar. 30, 2017, now Pat. No. 10,298,348.

(Continued)

(51) Int. Cl.
*H04B 10/00* (2013.01)
*H04J 3/06* (2006.01)

(52) U.S. Cl.
CPC .......... *H04J 3/0691* (2013.01); *H04J 3/0685* (2013.01); *H04J 2203/0089* (2013.01); *H04Q 2213/076* (2013.01)

(58) Field of Classification Search
USPC .................................................. 398/154–155
See application file for complete search history.

(56) References Cited

U.S. PATENT DOCUMENTS 5,844,908 A    12/1998  McCallan
6,208,667 B1*   3/2001  Caldara ................. H04J 3/0608
                                                        370/503

(Continued)

FOREIGN PATENT DOCUMENTS

GB        2478838         9/2011

OTHER PUBLICATIONS

Gamer, Geoffrey M.; Huawei Technologies Co., Ltd.; "Timing Domains and Timing-Related Processes in an OTN getwork Element"; COM 15-C 69-E, International Telecommunication Union; Study Period 2009-2012, Geneva, CH; vol. 11, 13115, Nov. 19, 2008, pp. 1-12.

(Continued)

*Primary Examiner* — Agustin Bello
(74) *Attorney, Agent, or Firm* — Grossman, Tucker, Perreault & Pfleger, PLLC

(57) ABSTRACT

A cross connect apparatus or system with transparent clocking, consistent with embodiments described herein, connects a selected source or ingress port to a selected destination or egress port and clocks data out of the selected egress port using a synthesized clock that is adjusted to match a recovered clock from the selected ingress port. A transparent clocking system may generate the synthesized clock signal with adjustments in response to a parts per million (PPM) rate detected for the associated recovered clock signal provided by the selected ingress port. The cross connect system with transparent clocking may be a 400G cross connect system with 10G resolution. The cross connect system with transparent clocking may be used in optical transport network (OTN) applications, for example, to provide an aggregator and/or an add-drop multiplexer (ADM) or to provide a reconfigurable optical add-drop multiplexer (ROADM) upgrade to a higher data rate.

15 Claims, 5 Drawing Sheets

Related U.S. Application Data

(60) Provisional application No. 62/317,194, filed on Apr. 1, 2016.

(56) References Cited

U.S. PATENT DOCUMENTS

| | | | |
|---|---|---|---|
| 6,208,672 B1 | 3/2001 | Gunning et al. | |
| 6,728,908 B1 | 4/2004 | Fukuhara et al. | |
| 6,781,984 B1* | 8/2004 | Adam | H04J 3/062 340/2.6 |
| 6,870,831 B2* | 3/2005 | Hughes | H04Q 11/06 370/352 |
| 6,965,737 B1* | 11/2005 | Somashekhar | H04B 10/29 398/51 |
| 7,102,446 B1* | 9/2006 | Lee | H03K 23/507 331/11 |
| 7,149,914 B1* | 12/2006 | Asaduzzaman | H03L 7/087 713/500 |
| 7,197,250 B2* | 3/2007 | Somashekhar | H04B 10/29 398/175 |
| 7,243,253 B1* | 7/2007 | McClary | H04L 12/66 345/537 |
| 7,352,835 B1* | 4/2008 | Asaduzzaman | H03L 7/0807 375/359 |
| 7,873,073 B2* | 1/2011 | Frlan | H04L 12/2885 370/466 |
| 8,081,639 B2* | 12/2011 | Weizeorick | H04J 3/062 370/395.62 |
| 8,274,892 B2* | 9/2012 | Chiang | H04J 3/1652 370/235 |
| 8,397,096 B2* | 3/2013 | Shumarayev | H03L 7/0805 713/500 |
| 8,542,708 B1* | 9/2013 | Mok | H04J 3/0685 370/503 |
| 8,619,931 B1* | 12/2013 | Pham | H04L 7/0337 375/355 |
| 8,665,738 B2* | 3/2014 | Katagiri | H04J 3/07 360/51 |
| 8,666,013 B1* | 3/2014 | Khor | H04L 7/0025 327/147 |
| 8,958,514 B2* | 2/2015 | Bruckman | H04J 3/0623 375/327 |
| 9,019,997 B1* | 4/2015 | Mok | H04B 10/07 370/503 |
| 9,143,142 B2* | 9/2015 | Meagher | H03L 7/18 |
| 9,236,969 B2* | 1/2016 | Valiveti | H04J 3/1652 |
| 9,362,926 B2* | 6/2016 | Dickerson | H03L 7/26 |
| 9,473,261 B1* | 10/2016 | Tse | H04J 3/1658 |
| 2005/0286521 A1* | 12/2005 | Chiang | H04J 3/1652 370/389 |
| 2007/0071443 A1* | 3/2007 | Fukumitsu | H04J 3/07 398/79 |
| 2007/0116061 A1* | 5/2007 | Meagher | H04J 3/1658 370/503 |
| 2008/0267223 A1* | 10/2008 | Meagher | H04J 3/07 370/505 |
| 2009/0074410 A1 | 3/2009 | Zou et al. | |
| 2009/0213873 A1* | 8/2009 | Frlan | H04J 3/1658 370/464 |
| 2009/0238320 A1* | 9/2009 | Ji | H04J 3/0658 375/362 |
| 2010/0192003 A1* | 7/2010 | Weizeorick | G06F 1/14 713/500 |
| 2011/0229133 A1* | 9/2011 | Katagiri | H04J 3/07 398/58 |
| 2011/0285434 A1* | 11/2011 | Shumarayev | H03L 7/0805 327/156 |
| 2011/0286744 A1* | 11/2011 | Shin | H04J 3/1652 398/45 |
| 2012/0039609 A1* | 2/2012 | Dong | H04J 3/1658 398/66 |
| 2012/0219291 A1 | 8/2012 | Chiku et al. | |
| 2012/0251106 A1* | 10/2012 | Valiveti | H04L 47/125 398/45 |
| 2012/0269511 A1* | 10/2012 | Calderon | H04J 3/1664 398/58 |
| 2013/0004169 A1* | 1/2013 | Mohamad | H04J 3/0691 398/45 |
| 2013/0108273 A1* | 5/2013 | Valiveti | H04J 3/1652 398/79 |
| 2015/0016578 A1* | 1/2015 | Bruckman | H04J 3/0623 375/354 |
| 2016/0050470 A1 | 2/2016 | Swinkels et al. | |
| 2016/0072513 A1* | 3/2016 | Dickerson | H03L 7/26 331/16 |
| 2016/0261275 A1* | 9/2016 | Dickerson | H03L 7/26 |
| 2017/0288849 A1* | 10/2017 | Boura | H04J 3/0691 |
| 2017/0317759 A1* | 11/2017 | Agazzi | H04L 7/0075 |

OTHER PUBLICATIONS

Communication and European Search Report dated Nov. 6, 2019 in corresponding European Patent Application No. 17776778.7.
"Optical Transport Network Switching: Creating efficient and cost-effective optical transport networks", Nokia Siemens Networks, 2011, pp. 1-16.
OTN Family/ "ODU Multiplexers for ODU Cross-Connect/TPOC244/TPOC314", Altera Corporation, 2013, 2 pgs.
Murakami, Makoto, Analyzing Power Consumption in Optical Cross-connect Equipment for Future Large-Capacity Optical Networks, Journal of Networks, vol. 5, No. 11, Nov. 2010, NTT Network Service Systems Laboratories, Tokyo, Japan, 2010 Academy Publisher, pp. 1254-1259.
"Introduction to Gapped Clocks and PLLs", Silicon Laboratories, 2010, 14 pgs.
"Gigabit Transceiver Block Highlights", Stratix GX Device Handbook, vol. 2, Altera Corporation, Jun. 2006, pp. 1-1 to 1-10.
"Receiver Phase Compensation FIFO", Altera Corporation, Dec. 2010, pp. 1-14.
PCT International Search Report and Written Opinion dated Aug. 22, 2017, received in PCT Application No. PCT/US17/25387, 14 pgs.

\* cited by examiner

TRANSPARENT CLOCKING IN CROSS CONNECT SYSTEM

RELATED APPLICATIONS

This application is a continuation of U.S. patent application Ser. No. 15/474,561, filed Mar. 30, 2017, now U.S. Pub. No. 2017-0288849, which claims the benefit of U.S. Provisional Application Ser. No. 62/317,194 filed on Apr. 1, 2016, which is fully incorporated herein by reference in its entirety.

TECHNICAL FIELD

The present disclosure relates to cross connect systems and more particularly, to transparent clocking in a cross connect system.

BACKGROUND INFORMATION

A cross connect system may be used to connect any one of a plurality of source or ingress ports to any one of a plurality of destination or egress ports. Data received from a source device coupled to the selected source/ingress port may thus be connected to the selected destination/egress port for transmission to a destination device. Optical cross connects, for example, may be used to reconfigure optical networks dynamically, for example, to manage traffic on the networks. Electrical-switching-based optical cross connects convert optical data signals to electrical data signals, perform electrical switching of the data signals between the ports, and then convert the electrical data signals back to optical data signals.

When electrical data signals are received, clock signals are recovered from the data signals and the recovered clock signals are used to clock the recovered data into the ingress ports and to clock data out of the egress ports. To use the same clock rate to clock the data out of the egress ports, e.g., to match input and output clock rates, the recovered clock signals may be multiplexed with the data being connected to the selected egress ports. Thus, every egress port is configured to be clocked by all of the ingress ports, and every ingress clock needs to be compensated for by every egress port. When a large number of ingress and egress ports are being cross connected, collapsing the multiple different clock domains is challenging, particularly in an FPGA implementation with limited clock resources. A 400G cross connect system with 10G resolution, for example, involves collapsing 40 different clock domains.

BRIEF DESCRIPTION OF THE DRAWINGS

These and other features and advantages will be better understood by reading the following detailed description, taken together with the drawings wherein.

DETAILED DESCRIPTION

A cross connect apparatus or system with transparent clocking, consistent with embodiments described herein, connects a selected source or ingress port to a selected destination or egress port and clocks data out of the selected egress port using a synthesized clock that is adjusted to match a recovered clock from the selected ingress port. A transparent clocking system may generate the synthesized clock signal with adjustments in response to a parts per million (PPM) rate detected for the associated recovered clock signal provided by the selected ingress port. The cross connect system with transparent clocking may be a 400G cross connect system with 10G resolution. The cross connect system with transparent clocking may be used in optical transport network (OTN) applications, for example, to provide an aggregator and/or an add-drop multiplexer (ADM) or to provide a reconfigurable optical add-drop multiplexer (ROADM) upgrade to a higher data rate (e.g., 10G to 100G).

Figure 1:
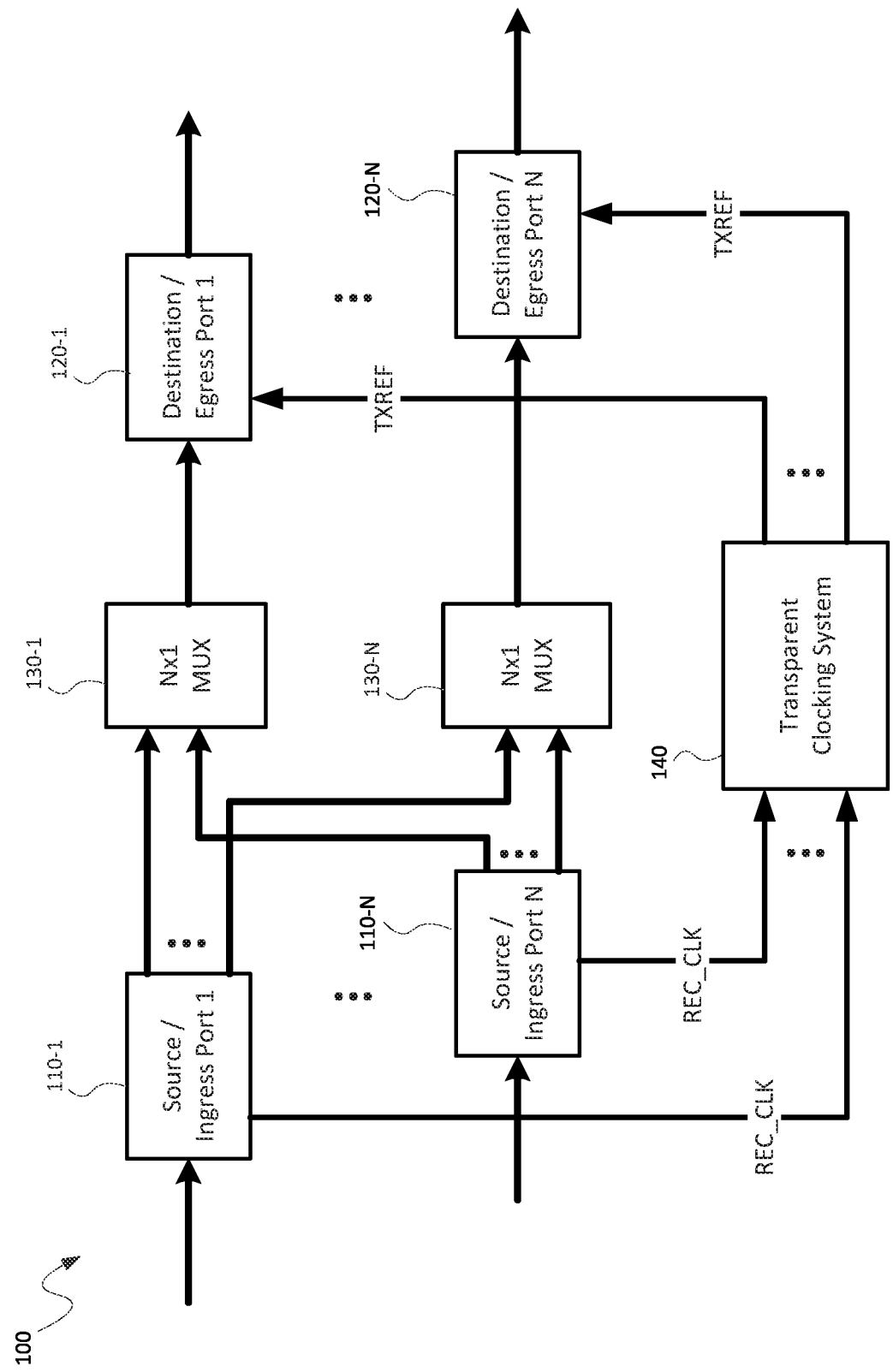
FIG. 1 is a schematic diagram of a cross connect system including a transparent clocking system, consistent with an embodiment of the present disclosure.

Referring to FIG. 1, a cross connect system 100, consistent with embodiments of the present disclosure, generally includes a plurality of source or ingress ports 110-1 to 110-N connected to a plurality of destination or egress ports 120-1 to 120-N via a plurality of multiplexers 130-1 to 130-N. Any one of the ingress ports 110-1 to 110-N may thus be connected to any one of the egress ports 120-1 to 110-N. Thus, the number of potential ingress to egress combinations allows for a large number of potential mappings. For instance, and in one non-limiting example embodiment, a 40 port system may be capable of 1600 potential ingress-egress, mappings (40×40=1600). Other port configurations, e.g., 10×10, 20×20, 60×60, are also within the scope of this disclosure.

Each of the source/ingress ports 110-1 to 110-N may include circuitry for receiving data signals and recovering data and clock signals (REC_CLK). Each one of the destination/egress ports 120-1 to 120-N may include circuitry for transmitting data signals that have been clocked using a synthesized clock signal (TXREF) adjusted to match a recovered clock signal (REC_CLK) from a selected one of the ingress ports 110-1 to 110-N being connected. The cross connect system 100 includes a transparent clocking system 140 for generating the synthesized clock signals (TXREF) in response to the recovered clock signals (REC_CLK), as will be described in greater detail below. As generally referred to herein, a transparent clock refers to an approach whereby the TX output clock (TXREF) for an egress port operates without direct synchronization with an associated input clock (REC_CLK) of a mapped ingress port. Instead, the TX output clock (TXREF) may be synthetically generated based on a measured clock rate difference (e.g., in parts per million (PPM)) between a recovered clock associated with an ingress port and a TX reference clock, with the TX reference clock have a rate greater than the associated input clock. The data being connected to a selected egress port from a selected ingress port may thus be clocked transparently through the cross connect system using a consistent and highly-accurate clock rate without having to multiplex the recovered clock signals, e.g., without having to maintain a separate clock or otherwise allocate dedicated clock resources for each ingress-egress port combination. Such a system is thus capable of handling multiple clock domains, e.g., up to 40 input/output ports or more, with limited clock resources, e.g., in a FPGA, Silicon Integrated Circuit (SIC) or other chip implementation having constrained clock resources. Accordingly, N number of ingress ports may be cross connected to N number of egress ports in a 1:1 fashion, with updates to the mappings between input and output ports being dynamic, e.g., based on user input, a remote command, dip switches, and other suitable programming approaches. This may allow for ports to be initially cross-coupled in a desired configuration, e.g., during factory configuration or site installation, and optionally reconfigured during operation for purposes of load balancing, traffic rerouting (e.g., in the event of a fault), network topology changes, unit swap-outs, and so on.

Figure 2:
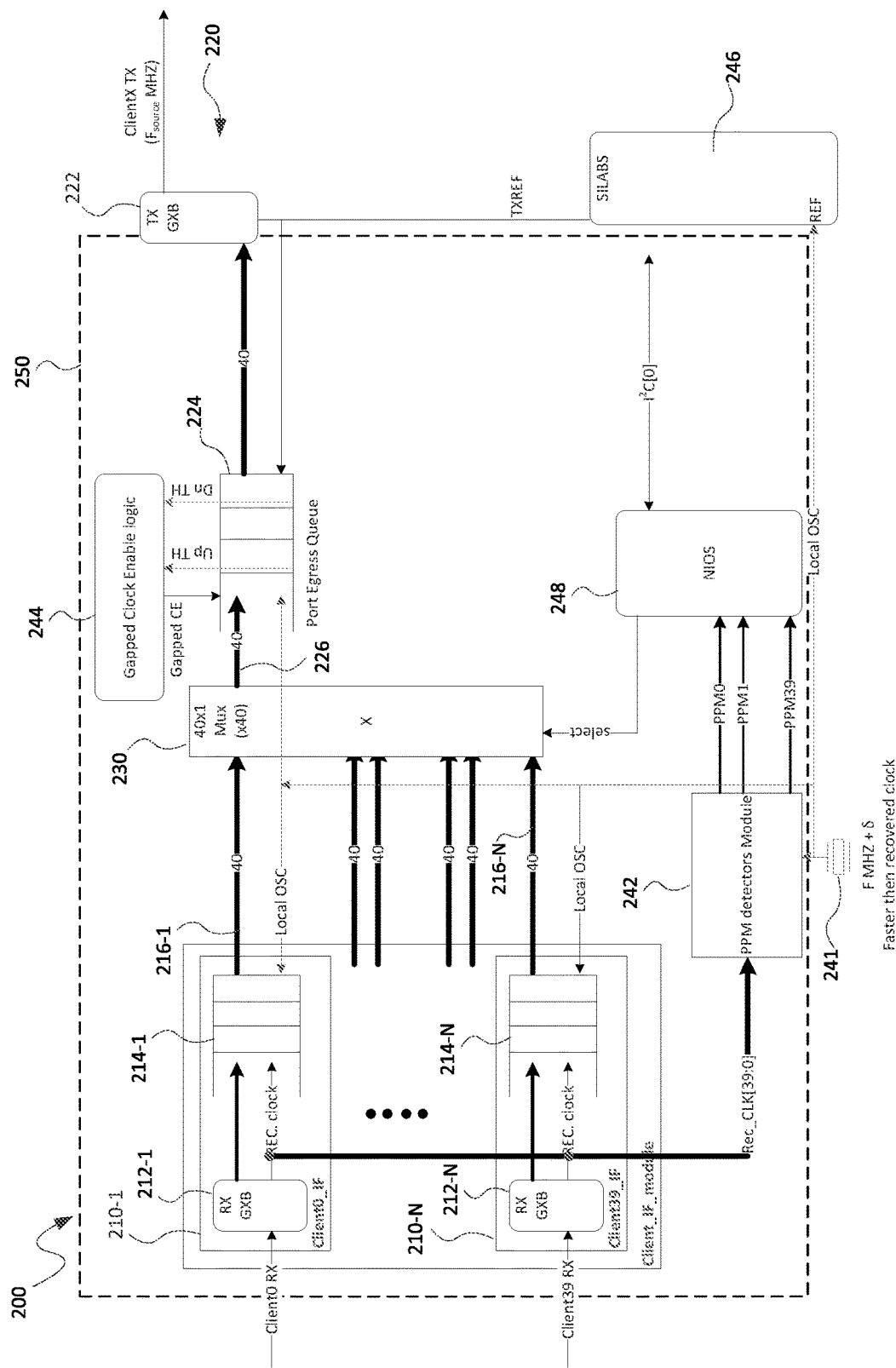
FIG. 2 is a schematic diagram of a 400G cross connect system with 10G resolution including transparent clocking, consistent with an embodiment of the present disclosure.

Referring to FIG. 2, an embodiment of a cross connect system 200 with transparent clocking is shown and described in greater detail. As shown, the cross connect system 200 includes a plurality of source/ingress ports 210-1 to 210-N coupled to a destination port 220 via a multiplexer 230. Although a single multiplexer 230 and destination port 220 is shown, the cross connect system 200 may include a plurality of multiplexers 230 connected to a plurality of respective destination ports 220 depending on a desired configuration. Other switching logic may also be used and the particular embodiment shown should not be construed as limiting. The cross connect system 200 may be implemented, whole or in part, within a single package 250. The single package 250 may comprise an FPGA, a SIC, or other suitable chip, for example. In some cases, the reference LO 241 and TX clock generator 246 may be implemented within separate chips/circuitry.

Each multiplexer 230 multiplexes a plurality of data paths 216-1 to 216-N from the plurality of respective source/ingress ports 210-1 to 210-N onto a single data path 226 to the respective destination/egress port 220. This defines a static connection that establishes the connection from ingress port to egress port on the cross connect system 200. Each of the data paths 216-1 to 216-N may include a multiple bit bus for connecting to multiple respective destinations.

In the illustrated embodiment showing a 400G cross connect system 200 with 10G resolution, 40 source/ingress ports 210-1 to 210-N each receive data signals at a 10G data rate. Each destination/egress port 220 may thus get its inputs from 40 source/ingress ports 210-1 to 210-N. In this example, the source/ingress ports 210-1 to 210-N are connected to 40 bit bus data paths 216-1 to 216-N, respectively. The source/ingress ports 210-1 to 210-N may be implemented in client interfaces receiving OTU2 data signals as defined by the Optical Transport Network (OTN) standard (also known as ITU-T Recommendation G.709), although other embodiments are also within the scope of this disclosure.

Each of the source/ingress ports 210-1 to 210-N includes a receiver 212-1 to 212-N coupled to an ingress FIFO module 214-1 to 214-N. The receivers 212-1 to 212-N receive data signals (e.g., Client0 RX to Client39 RX) and recover the data and clock from the respective received data signals. The recovered data is clocked into the ingress FIFO module 214-1 to 214-N of each respective source/ingress port using the recovered clock signal. The data paths 216-1 to 216-N from the ingress FIFO modules 214-1 to 214-N may be multiplexed into the single data path 226 to the destination/egress port 220 through a user selectable destination register. The selection register may include a two dimensional data structure representing all possible ingress-egress combinations. For each egress port, for example, there may be a 6 bit vector that represents the ID of the ingress port that is feeding it, although other address/register schemes may be used. In the example embodiment, there may be 40 selectable destination registers. Each destination/egress port 220 includes a transmitter 222 coupled to an egress FIFO module 224. The multiplexed data is clocked into the egress FIFO module 224 from the multiplexed data path 226 and clocked out of the egress FIFO module 224 for transmission by the transmitter 222, as will be described in greater detail below. The receivers and transmitters may be part of a gigabit transceiver block (GXB).

To provide the transparent clocking, this embodiment of the cross connect system 200 further includes a local oscillator (LO) 241 or reference LO 241, a parts per million (PPM) detectors module 242, gapped clock enable logic 244, a TX clock generator 246, and control logic 248 such as a processor or a dedicated finite state machine (FSM). The TX clock generator 246 may be implemented as a phase locked loop (PLL) or any other circuitry/chip capable of fine-grain PPM adjustment to match ingress-egress clock rates. Although one TX clock generator 246 is shown, this disclosure is not necessarily limited in this regard. For example, each TX clock generator 246 may service one or more egress ports, and thus, the cross connect system 200 may include N number of TX clock generators. The reference LO 241 provides a local clock signal, running faster than any of the recovered clock signals, to each of the ingress FIFO modules 214-1 to 214-N, to each egress FIFO module 224, to the PPM detectors module 242, and to the TX clock generator 246. A single reference LO, e.g., reference LO 241, may be utilized to accommodate N number of input-output/ingress-egress ports, although in some implementations two or more reference LO ports may be utilized depending on a desired configuration. This advantageously avoids the necessity of having a separate clock maintained for each potential ingress-egress port mapping.

Data may be clocked from a FIFO modules 214-1 to 214-N to a mapped egress queue, e.g., egress FIFO module 224, based on the clock rate of the reference LO 241. The PPM detectors module 242 may include a PPM detector for each of the source/ingress ports 210-1 to 210-N to detect a PPM rate of the recovered clock for each of the source/ingress ports 210-1 to 210-N relative to the reference LO 241. The gapped clock enable logic 244 monitors the FIFO fill levels of the egress FIFO module 224 and adjusts the write clock of the egress FIFO module 224 to skip a clock cycle as needed to match the data rate of the selected source/ingress port. By way of example, consider a recovered clock equals 40 Gps and the reference LO 241 is operating at a faster rate such as 10× the recovered clock. In this example, $\frac{1}{10}^{th}$ of the overall clocks cycles may be "skipped" to cause data to be output by a transmitter, e.g., 222, at a matching rate of 40 Gbps. In some cases, the gapped clock enable logic 244 outputs a signal, e.g., a skip signal, to cause one or more clock ticks to be skipped/ignored.

To achieve this matched rate between input and mapped output, the TX clock generator 246 generates the synthesized clock signal (TXREF) for clocking data from the read side of the egress FIFO module 224. The control logic 248 controls the selection of the source and destination ports, receives the PPM rates from the PPM detectors module 242, and communicates with the TX clock generator 246, for example, using I²C controller integration. The control logic 248 may thus select one of the source ports 210-1 to 210-N via the multiplexer 230 to establish a connection to the destination port 220, e.g., based on a user-defined mapping, and then pass the detected PPM rate for the selected source port to the TX clock generator 246. As discussed above, the PPM rate is relative to difference between the reference LO 241 and a recovered clock. The TX clock generator 246 may then adjust or otherwise fine-tune the synthesized clock (TXREF) based on the PPM difference relative to the local oscillator signal used to clock data into the egress FIFO module 224. The synthesized clock signal (TXREF) thus matches the recovered clock frequency for the selected ingress port being connected to the egress port, and each of the ingress ports may have its own synthesized clock signal generated by the TX clock generator 246 and used as a transmit reference at the connected egress port. The clocking throughout the cross connect system 200 may thus be transparent such that the following equation is satisfied: the recovered clock=the gapped local oscillator=TXREF.

Figure 3:
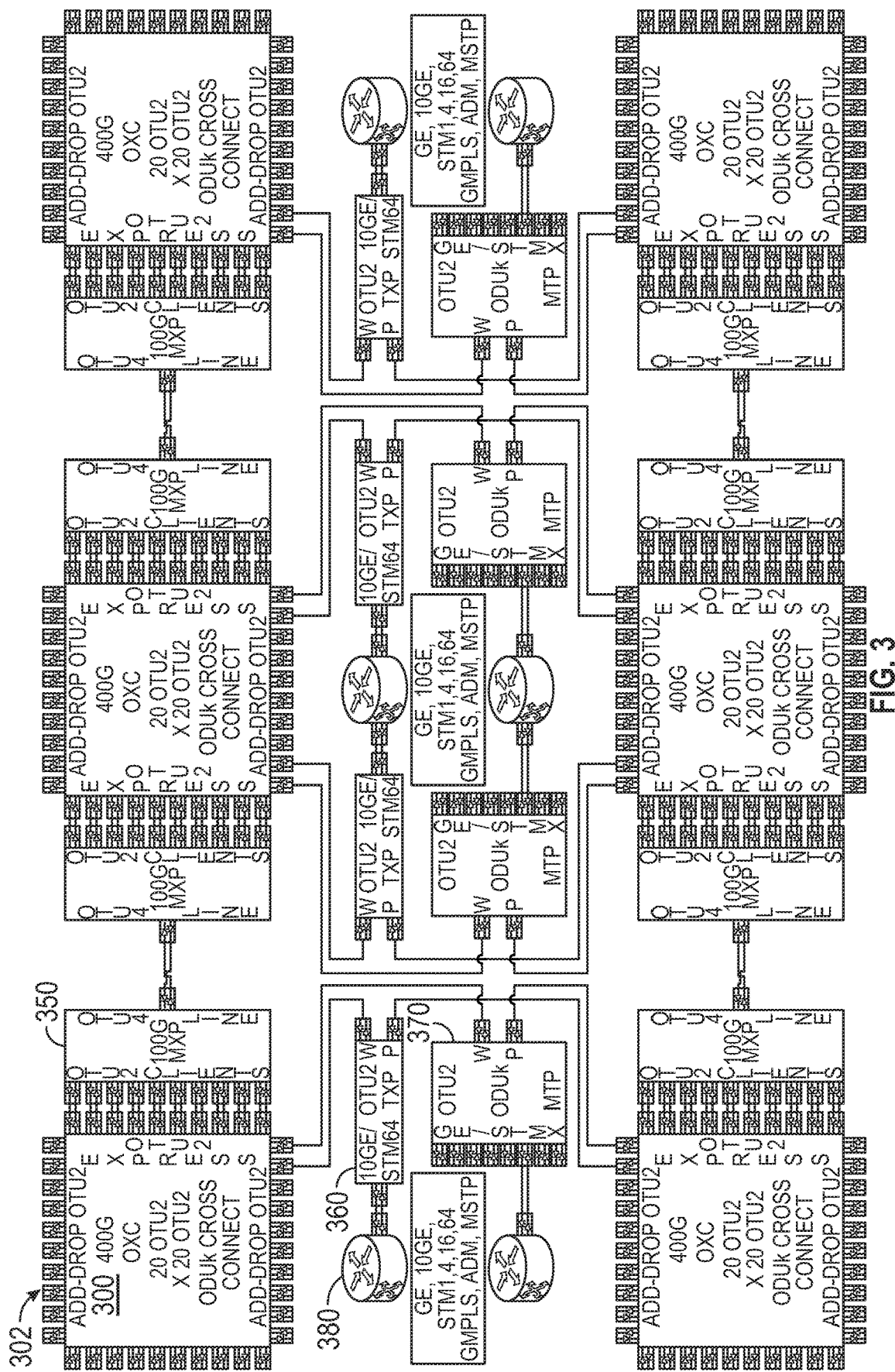
FIG. 3 illustrates one application for a cross connect system, consistent with embodiments of the present disclosure, as an aggregator and add-drop multiplexer (ADM).
Figure 4:
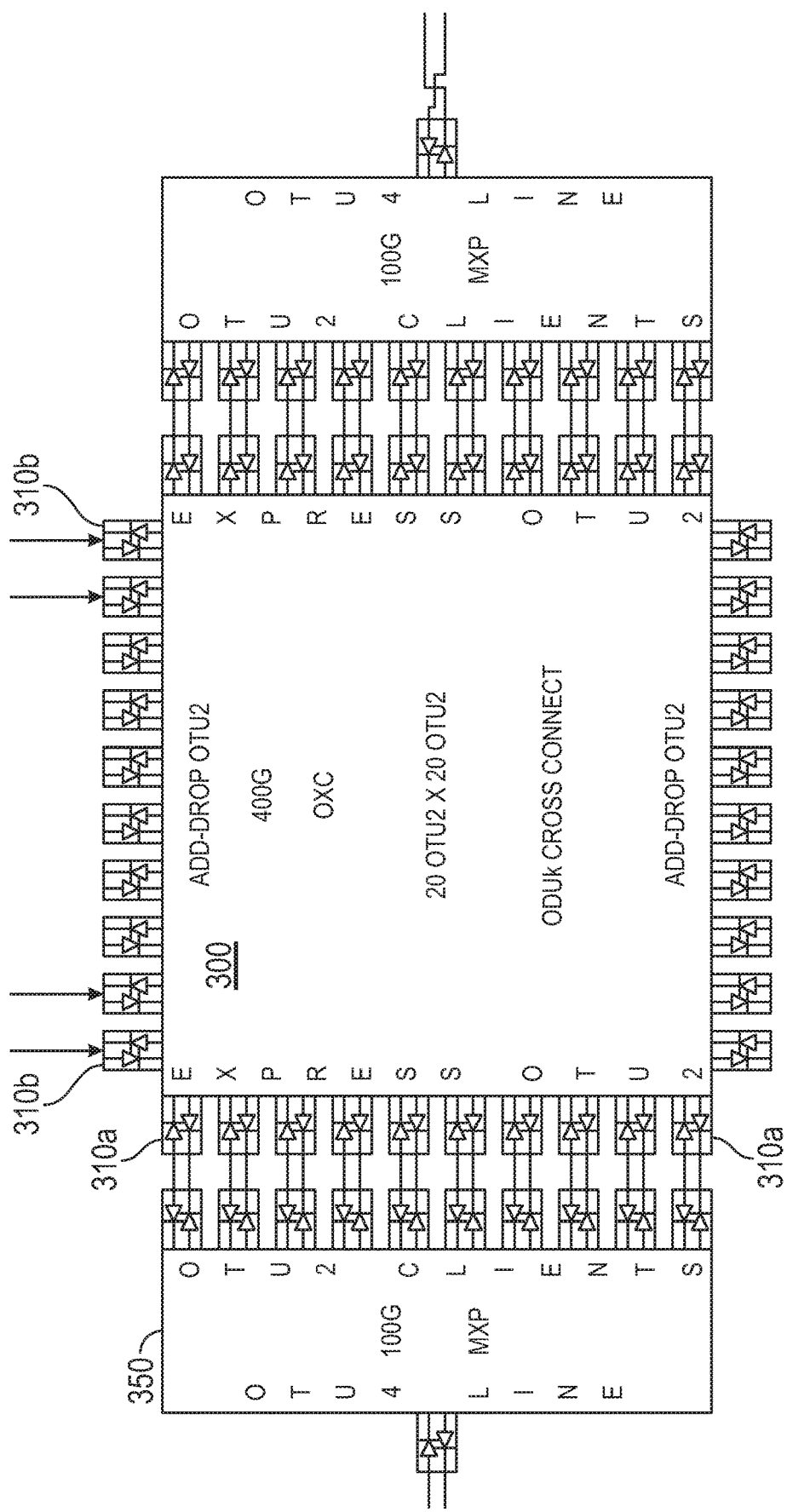
FIG. 4 is an enlarged view of an ODUk cross connect shown in FIG. 3.
Figure 5:
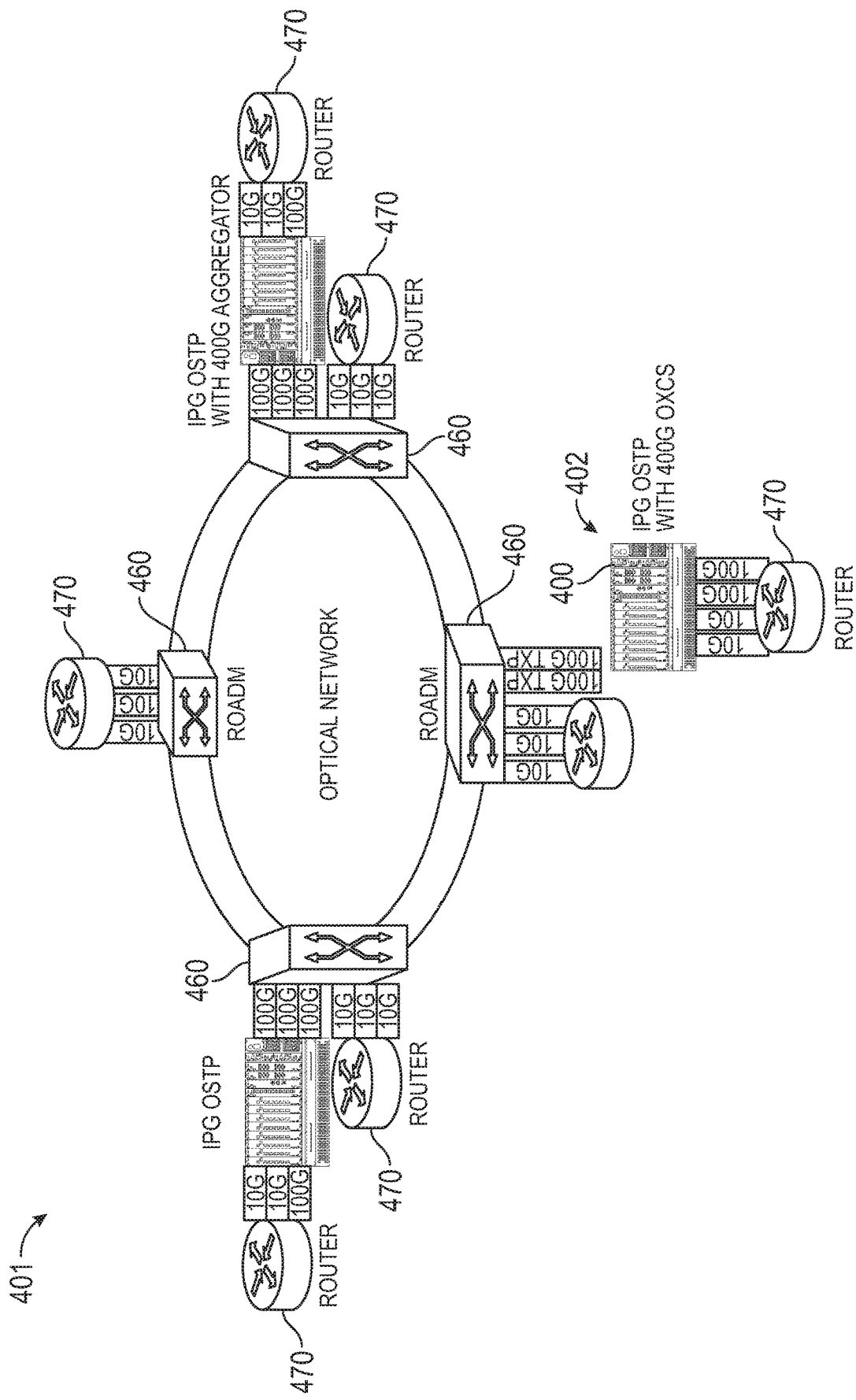
FIG. 5 illustrates another application for a cross connect system, consistent with embodiments of the present disclosure, in an optical services transport platform (OSTP) for upgrading a reconfigurable optical add-drop multiplexer (ROADM) system.

FIGS. 3-5 illustrate OTN applications for embodiments of a cross connect apparatus or system with transparent clocking. In these embodiments, the cross connect system apparatus or system is an electrical-switching based optical cross connect (OXC).

Referring to FIGS. 3 and 4, a cross connect apparatus or system with transparent clocking, consistent with embodiments described herein, may be used as an aggregator and/or ADM. In the illustrated embodiment, a system 302 includes at least one ODUk cross connect apparatus 300 including a plurality of express ports 310a including pairs of ingress ports and egress ports and a plurality of add-drop ports 310b including pairs of ingress ports and egress ports. One or more muxponders (MXPs) 350 are connected to one or more groups of the express ports 310a. One or more transponders, such as transponder 360 and multi-mode transponder 370, are connected to one or more add-drop ports 310b. In the illustrated embodiment, the ODUk cross connect apparatus 300 is a 400G cross connect providing 20 OTU2×20 OTU2 connectivity; however, other embodiments are within the scope of the present disclosure.

Referring to FIG. 5, a cross connect system with transparent clocking, consistent with embodiments described herein, may be used to provide a ROADM system upgrade to a higher data rate (e.g., from 10G to 100G). In the illustrated embodiment, an optical network 401 includes ROADMs 460 coupled to routers 470. To upgrade to 100G, an optical services transport platform (OSTP) 402 with an optical cross connect 400 is coupled between the ROADM 460 and the router 470.

Accordingly, a cross connect apparatus or system with transparent clocking is capable of handling multiple clock domains without multiplexing the recovered clock signals and with limited clock resources (e.g., in a FPGA implementation). This advantageously minimizes the overall number of components to accomplish flexible cross connecting of ports, which reduces the potential for component failure and reduces the overall physical footprint of cross connect circuitry to achieve high-density implementations. An electrical-switching-based optical cross connect (OXC) may be useful, for example, in high data rate OTN applications.

In accordance with an aspect of the disclosure an apparatus is disclosed. The apparatus including a plurality of source ports for receiving data signals from sources and recovering clock signals from the data signals, a plurality of destination ports for transmitting data signals to destinations, a plurality of multiplexers coupled between the source ports and the destination ports, the multiplexers being configured to selectively pass the data signals from a selected one of the source ports to a selected one of the destination ports, and a transparent clocking system configured to generate synthesized clock signals adjusted to match recovered clock signals for selected ones of the source ports and configured to clock data from selected ones of the destination ports without multiplexing the recovered clock signals.

In accordance with another aspect of the present disclosure an apparatus is disclosed. The apparatus comprising a plurality of source ports for receiving data signals and recovering clock signals, each of the source ports being configured to clock recovered data into an ingress FIFO module, at least one destination port for transmitting data signals, the at least one destination port being configured to clock data out of an egress FIFO module, at least one multiplexer coupled between the source ports and the at least one destination port, the at least one multiplexer being configured to multiplex a plurality of data paths from the plurality of source ports to a single data path to the at least one destination port and to select one of the source ports for connection to the destination port, a local oscillator running faster than the recovered clock signals, for clocking data into the egress FIFO module, a parts per million (PPM) detectors module configured to detect PPM rates of selected recovered clock signals, gapped clock enable logic configured to adjust a write clock of the egress FIFO module in response to a data rate of a corresponding selected recovered clock signal, a clock generator configured to generate a synthesized clock signal for the at least one destination port in response to the detected PPM rate of the selected recovered clock signal, and control logic implemented as a processor or finite state machine, the control logic coupled to the PPM detectors module, the multiplexer, and the clock generator, the control logic being configured to control selection of the source ports via the multiplexer and to receive the PPM rates and pass the PPM rate of the corresponding selected recovered clock signal to the clock generator.

In accordance with another aspect of the present disclosure a system is disclosed. The system comprising at least one ODUk cross connect apparatus comprising, a plurality of OTU express ports including pairs of ingress ports and egress ports, a plurality of OTU add-drop ports including pairs of ingress ports and egress ports, a plurality of multiplexers between ingress ports and egress ports, the multiplexers being configured to selectively pass data signals from any one of the ingress ports to any one of the egress ports, and a transparent clocking system configured to generate synthesized clock signals adjusted to match recovered clock signals for selected ones of the ingress ports and configured to clock data from selected ones of the egress ports without multiplexing the recovered clock signals, at least a first muxponder coupled to at least a first group of the express ports, and at least one transponder coupled to at least one of the add-drop ports.

In accordance with another aspect of the present disclosure a system is disclosed. The system comprising an optical services transport platform (OSTP) configured to be coupled to a reconfigurable optical add-drop multiplexer (ROADM) and configured to be coupled to a router, and an optical cross connect apparatus comprising a plurality of ingress ports and a plurality of egress ports, a plurality of multiplexers between ingress ports and egress ports of the client interfaces, the multiplexers being configured to selectively pass data signals from any one of the ingress ports to any one of the egress ports, and a transparent clocking system configured to generate synthesized clock signals adjusted to match recovered clock signals for selected ones of the ingress ports and configured to clock data from selected ones of the egress ports without multiplexing the recovered clock signals.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A method for providing transparent clocking between a plurality of ingress ports and a plurality of egress ports in a cross-connect system, the method comprising:
   receiving a data signal at a first ingress port of the plurality of ingress ports and recovering a clock signal from the data signal;
   generating a synthesized clock signal based on the recovered clock signal, the synthesized clock signal being adjusted to match the recovered clock signal;
   passing data representing the received data signal from the first ingress port to a selected one of the egress ports; and
   wherein passing the data representing the received data signal includes clocking the data at the selected one of the egress ports in order to transmit a signal based on the synthesized clock signal such that the clock frequency of the signal transmitted by the selected one of the egress ports substantially matches the clock frequency of the data signal received at the first ingress port.

2. The method of claim 1, wherein generating the synthesized clock signal further comprises determining a difference between a measured clock rate of the recovered clock signal and a transmit reference clock associated with the plurality of egress ports, the transmit reference clock having a clock rate greater than the measured clock rate of the recovered clock signal.

3. The method of claim 2, wherein determining the difference between the measured clock rate of the recovered clock signal and the transmit reference clock further comprises comparing a detected parts per million (PPM) rate of the recovered clock signal relative to a PPM rate of the transmit reference clock.

4. The method of claim 2, wherein generating the synthesized clock signal includes using the difference between the measured clock rate of the recovered clock signal and the transmit reference clock to determine a number of cycles to skip, and wherein the synthesized clock signal is introduced by clocking using the transmit reference clock and skipping the determined number of cycles while clocking with the transmit reference clock such that the clock rate of the synthesized clock signal is less than the clock rate of the transmit reference clock and is substantially equal to the clock rate of the recovered clock signal.

5. The method of claim 1, the method further comprising establishing a map in a memory that associates each ingress port of the plurality of ingress ports to one or more egress ports, and wherein selection of the selected one of the ingress ports and the selected one of the egress ports is based on the map.

6. The method of claim 5, further comprising updating the map based on user input to dynamically map at least one ingress port of the plurality of ingress ports to one or more egress ports of the plurality of egress ports.

7. The method of claim 1, wherein generating a synthesized clock signal further comprises generating a synthesized clock signal for each ingress port of the plurality of ingress ports based on an associated recovered clock signal.

8. The method of claim 1, wherein passing the data representing the received data signal further includes multiplexing data received at each ingress port by a common multiplexer that operates as a single data path for the plurality of ingress ports.

9. The method of claim 1, wherein generating the synthesized clock signal based on the recovered clock signal further comprises adjusting a clock rate of a local oscillator associated with the selected one of the egress ports such that received data gets clocked into an egress queue associated with the selected one of the egress ports without multiplexing the recovered clock signal.

10. A method for providing transparent clocking between a plurality of ingress ports and a plurality of egress ports in a cross-connect system, the method comprising:
    clocking data received at each ingress port of the plurality of ingress ports into a corresponding ingress queue;
    recovering a clock signal for the data received at each ingress port; and
    clocking data from each ingress port into a corresponding egress port via a multiplexer and local oscillator, the multiplexer being configured to multiplex data from each ingress queue into a single data path and the local oscillator used to synthetically generate a transmit clock for each egress port, the synthetically generated transmit clock for each egress port having a clock rate that substantially matches the clock rate of the recovered clock signal for an associated ingress port.

11. The method of claim 10, wherein generating the synthetic transmit clock further comprises determining a difference between a measured clock rate of the recovered clock signal and the clock rate of the local oscillator.

12. The method of claim 11, wherein determining the difference between the measured clock rate of the recovered clock signal and the local oscillator further comprises comparing a detected parts per million (PPM) rate of the recovered clock signal relative to a PPM rate of the local oscillator.

13. The method of claim 10, the method further comprising establishing a map in a memory that dynamically associates each ingress port of the plurality of ingress ports to one or more egress ports, and wherein clocking data from each ingress port into the corresponding egress port is based on the map.

14. The method of claim 13, further comprising updating the map based on user input to dynamically adjust associations between each ingress port and corresponding egress ports.

15. The method of claim 10, wherein synthetically generating the transmit clock for each egress port further comprises skipping one or more clock cycles of the local oscillator such that data gets written to each egress port at a clock rate that substantially matches the clock rate of the associated recovered clock signal.

* * * * *